United States Patent
Chini et al.

(10) Patent No.: US 7,564,800 B2
(45) Date of Patent: *Jul. 21, 2009

(54) SYSTEM AND METHOD FOR MODULATION OF NON-DATA BEARING CARRIERS IN A MULTI-CARRIER MODULATION SYSTEM

(75) Inventors: Ahmad Chini, Vaughan (CA); Javad Omidi, Mississauga (CA); Hossein Alavi, Mississauga (CA)

(73) Assignee: Maxim Integrated Products, Inc., Sunnyvale, CA (US)

( * ) Notice: Subject to any disclaimer, the term of this patent is extended or adjusted under 35 U.S.C. 154(b) by 318 days.

This patent is subject to a terminal disclaimer.

(21) Appl. No.: 11/386,396

(22) Filed: Mar. 22, 2006

(65) Prior Publication Data

US 2006/0227699 A1    Oct. 12, 2006

Related U.S. Application Data

(63) Continuation of application No. 09/883,554, filed on Jun. 16, 2001, now Pat. No. 7,020,095.

(51) Int. Cl.
*H04J 1/16* (2006.01)
(52) U.S. Cl. ........................ 370/252; 375/260
(58) Field of Classification Search ................ 370/204, 370/205, 208, 210, 212, 252, 484; 375/260
See application file for complete search history.

(56) References Cited

U.S. PATENT DOCUMENTS

| | | | |
|---|---|---|---|
| 5,682,376 A | 10/1997 | Hayashino et al. |
| 5,694,415 A | 12/1997 | Suzuki et al. |
| 5,726,978 A | 3/1998 | Frodigh et al. |
| 5,732,113 A | 3/1998 | Schmidl et al. |
| 5,790,550 A | 8/1998 | Peeters et al. |
| 5,764,706 A | 9/1998 | Carlin et al. |
| 5,812,599 A | 9/1998 | Van Kerckhove |
| 5,861,834 A | 1/1999 | Sauer et al. |
| 5,956,642 A | 9/1999 | Larsson et al. |

(Continued)

FOREIGN PATENT DOCUMENTS

CN    1231089    10/1999

(Continued)

OTHER PUBLICATIONS

Jones, D.L., "PEak Power Reduction in OFDM and DMT Via Active Channel MOdification" Signals, Systems, and Computers; Conference Record of the Thirty-Third Asilomar Conference on Oct. 24-27, 1999; Piscataway, NJ, USA, IEEE pp. 1076-1079; XP010373802; ISBN 0-7803-5700-0.

(Continued)

*Primary Examiner*—Wing F Chan
*Assistant Examiner*—Duc T Duong
(74) *Attorney, Agent, or Firm*—Blakely Sokoloff Taylor & Zafman LLP

(57) ABSTRACT

For one aspect of the invention, a method is described for mitigating power spectral density irregularities in a multi-carrier modulation environment. The method involves identifying at least one carrier of a plurality of carriers that is in a non-data bearing state. Thereafter, that carrier is modulated with random data.

17 Claims, 6 Drawing Sheets

U.S. PATENT DOCUMENTS

| | | | |
|---|---|---|---|
| 5,974,078 A | 10/1999 | Tuttle et al. | |
| 6,023,488 A | 2/2000 | White | |
| 6,026,123 A | 2/2000 | Williams | |
| 6,026,488 A | 2/2000 | White | |
| 6,049,535 A | 4/2000 | Ozukturk et al. | |
| 6,160,990 A | 12/2000 | Kobayashi et al. | |
| 6,370,156 B2 | 4/2002 | Spruyt et al. | |
| 6,442,129 B1 | 8/2002 | Yonge et al. | |
| 6,456,649 B1 | 9/2002 | Isaksson et al. | |
| 6,493,395 B1 | 12/2002 | Isaksson et al. | |
| RE38,603 E * | 9/2004 | Kim et al. | 375/141 |
| 2002/0065047 A1 | 5/2002 | Moose | |

FOREIGN PATENT DOCUMENTS

| | | |
|---|---|---|
| EP | 0725510 A | 8/1996 |
| WO | WO 9748197 A | 12/1997 |
| WO | WO 9810551 A | 3/1998 |
| WO | WO 0115403 A | 3/2001 |

OTHER PUBLICATIONS

Cypress Semiconductor Corporation Data Sheet: Spread Spectrum Motherboard Frequency Generator: W48S101-04; Oct. 27, 1999.

"Reasons for Bringing Isaksson Prior Art to the Attention of the Patent Examiner"; Third Party Counsel, Sep. 27, 2005.

Chinese Office Action dated Sep. 19, 2008 for application No. 028160029 (U.S. Appl. No. 11/386,396), entitled System and Method for Modulation of Non-Data Bearing Carriers in a Multi-Carrier Modulation System . (English Translation).

Chinese Office Action dated Mar. 27, 2009 for application No. CN 02816002.9 (U.S. Appl. No. 11/386,396), entitled System and Method for Modulation of Non-Data Bearing Carriers ina Multi-Carrier Modulation System. (English Translation).

\* cited by examiner

SYSTEM AND METHOD FOR MODULATION OF NON-DATA BEARING CARRIERS IN A MULTI-CARRIER MODULATION SYSTEM

CROSS-REFERENCES TO RELATED APPLICATIONS

This application is a continuation of application Ser. No. 09/883,554, filed Jun. 16, 2001 now U.S. Pat. No. 7,020,095.

FIELD

The invention relates to the field of communications. In particular, one embodiment of the invention relates to a system and method for mitigating power spectral density irregularities through modulation of random data onto non-data bearing carriers.

GENERAL BACKGROUND

For many years, a number of modulation techniques have been used to transfer data from a source to a destination. One type of modulation technique is referred to as multi-carrier modulation (MCM). In accordance with MCM, data is split into several data components and each of these data components is transmitted over separate carriers so that each individual carrier has a narrower bandwidth than the composite signal. In general, a "carrier" is an electromagnetic pulse or wave transmitted at a steady base frequency of alternation on which information can be imposed. Of course, when used in connection with fiber optic medium, the carrier may be a light beam on which information can be imposed.

Currently, there exist a number of multi-carrier modulation schemes such as Orthogonal Frequency Division Multiplexing (OFDM) for example. OFDM subdivides the available spectrum into a number of narrow band channels (e.g., 100 channels or more). The carriers for each channel may be spaced much closer together than Frequency Division Multiplexing (FDM) based systems because each carrier is configured to be orthogonal to its adjacent carriers. This orthogonal relationship may be achieved by setting each carrier to have an integer number of cycles over a symbol period. Thus, the spectrum of each carrier has a null at the center frequency of each of the other carriers in the system. This results in no interference between the carriers, allowing then to be spaced as close as theoretically possible.

In many instances, MCM systems are designed to avoid modulating information onto carriers that are unreliable, placing them in a "non-data bearing" state. The carriers are rendered unreliable when they are experiencing unfavorable channel characterizations such as fading, a high degree of interference and the like. Normally, a carrier is determined to be "unreliable" based on channel measurements at the receiver. Since channel characterizations for each unreliable carrier may vary over time, they are periodically monitored through modulation of constant or alternating data (e.g., logic "0"s or "1"s) onto these carriers (i.e., an unreliable carrier is modulated with constant data). Non-data bearing carriers may also be used as pilot tones for channel estimation, timing and carrier recovery.

When using an Inverse Fast Fourier Transform (IFFT) to produce multiple carriers, constant or alternating data modulated carries result in harmonics with concentrated energy at these non-data bearing carriers, which produce Power Spectral Density (PSD) irregularities or peaks at these carriers.

For example, as shown in FIG. 1, a power spectrum of a transmit signal (e.g., a HOMEPLUG™ packet) using an OFMD modulation technique is illustrated. As shown, four carriers associated with channels 10, 20, 40 and 60 are modulated with constant data (e.g., "11" for Differential Quadrature Phase Shift Keying "DQPSK"). This causes PSD peaks 100, 110, 120 and 130 at those carriers rising approximately eight decibels (8 dB) above the power spectrum 140.

As a result, in order to comply with strict Federal Communication Commission (FCC) power level standards and avoid interference to other users of the band, the total power of the transmit signal must be reduced. This reduces signal quality (e.g., signal-to-noise ratio) detected at the receiver which, in turn, reduces coverage of the receiver, data throughput, and the like.

Thus, it would be advantageous to develop a modulation technique that mitigates PSD irregularities occurring at non-data bearing carriers.

BRIEF DESCRIPTION OF THE DRAWINGS

The features and advantages of the present invention will become apparent from the following detailed description of the present invention in which.

DETAILED DESCRIPTION

Herein, various embodiments of the invention relate to a system and method for mitigating power spectral density irregularities through modulation of random data onto non-data bearing carriers, namely modulating each carrier currently in a non-data bearing state with random data. Herein, this "non-data bearing" state compromises a level of operation where a carrier is used for other purposes besides data transmission such as synchronization, carrier recovery, timing recovery, channel characterization, and may be also in an "unreliable" state when that carrier is experiencing unfavorable channel characterizations. Of course, non-data bearing carriers may also be used as pilot tones for channel estimation, timing and carrier recovery.

The embodiments described herein are not exclusive; rather, they merely provide a thorough understanding of the invention. Also, well-known circuits are not set forth in detail in order to avoid unnecessarily obscuring the invention.

In the following description, certain terminology is used to describe certain features of the invention. For example, "logic" includes hardware, firmware, software or any combination thereof that performs a desired function on input data. For example, in one embodiment, logic comprises a processing unit accessing software contained in memory to perform a non-data bearing carrier random data modulation scheme as described in greater detail in FIGS. 5-6. Examples of a "processing unit" include as a digital signal processor, a microprocessor, a micro-controller, an application specific integrated circuit (ASIC), a field programmable gate array, a state machine, combinatorial logic and the like.

In addition, a "link" is generally defined as one or more physical or virtual information-carrying mediums to establish a communication pathway. Examples of the medium include a physical medium (e.g., electrical wire, optical fiber, cable, bus traces, etc.) or a wireless medium (e.g., air in combination with wireless signaling technology). In one embodiment, the link may be an Alternating Current (AC) power line, perhaps routing information in accordance with a HOMEPLUG™ standard. One version of the HOMEPLUG™ standard is entitled "Release V0.8 Medium Interface Specification" published on or around May 25, 2001.

In general, a "non-data bearing" carrier may occur in any modulation scheme that produces a carrier or pilot tone that is used for other purposes besides data transmission, such as synchronization, carrier recovery, timing recovery or channel characterization for example. Various applications may include, but are not limited or restricted to Orthogonal Frequency Division Multiplexing (OFDM), Frequency Division Multiple Access (FDMA), Spread Spectrum, Frequency Division Multiplexing (FDM) or even wavelet based modulation.

Figure 1:
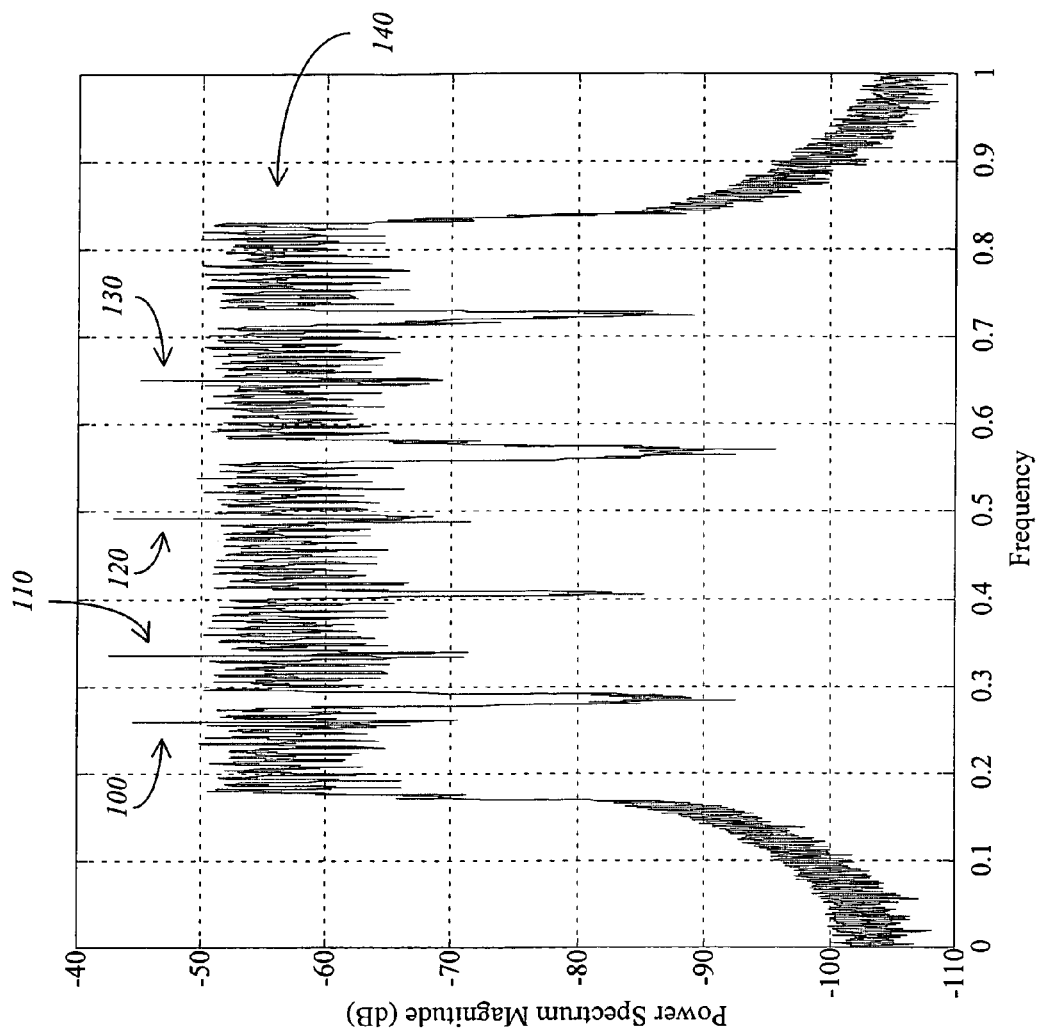
FIG. 1 is a power spectrum of a transmit signal (e.g., a HOMEPLUG™ packet) using an OFMD modulation technique.
Figure 2:
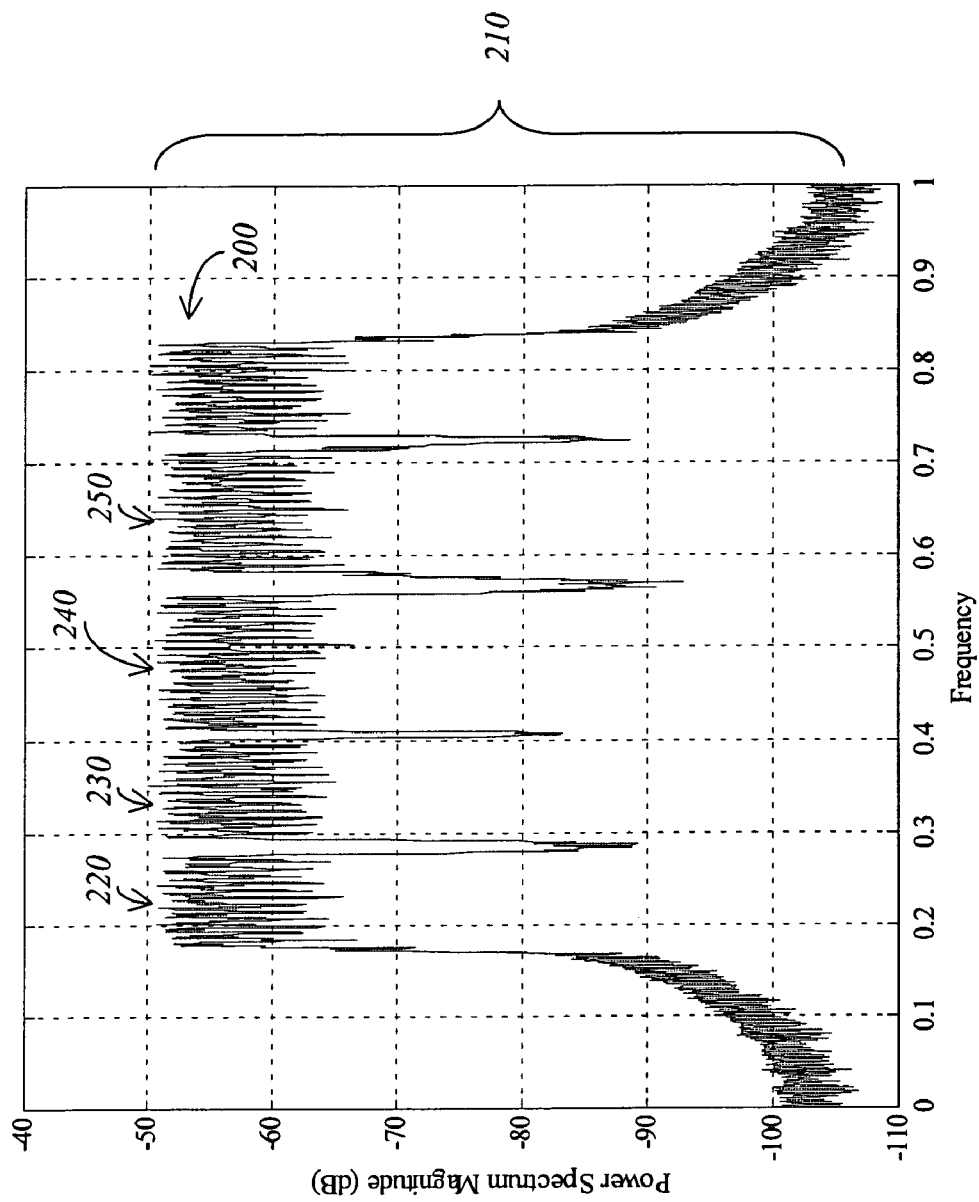
FIG. 2 is an exemplary embodiment of a power spectrum of a composite transmit signal of FIG. 1 produced by a multi-carrier modulation (MCM) system that modulates random data onto non-data bearing carriers.

Referring to FIG. 2, an exemplary embodiment of a power spectrum of a composite transmit signal produced by a multi-carrier modulation (MCM) system that modulates random data onto non-data bearing carriers is shown. The power spectrum 200 is produced for a composite transmit signal 210 having N carriers, where "N" is a positive integer (N≧1). As shown previously in FIG. 1, the transmit signal 210 features non-data bearing carrier numbers 10, 20, 40 and 60, which are represented by labels 220, 230, 240 and 250, that are now modulated with random data. This method is referred to herein as "non-data bearing carrier random modulation." The "random data" may be either (1) truly random in nature and produced by a random bit generator or (2) pseudo-random in nature and produced by a pseudo-random bit generator.

As shown in FIG. 2, the modulation of non-data bearing carriers with random data greatly mitigates the presence of power spectral density (PSD) irregularities at frequencies associated with non-data bearing carriers 220, 230 and 240 and 250. The reduction of PSD irregularities is due to the non-periodic nature of the modulated carrier. Thus, power is not concentrated at these portions of the power spectrum 200, but rather is continuously distributed.

Figure 3:
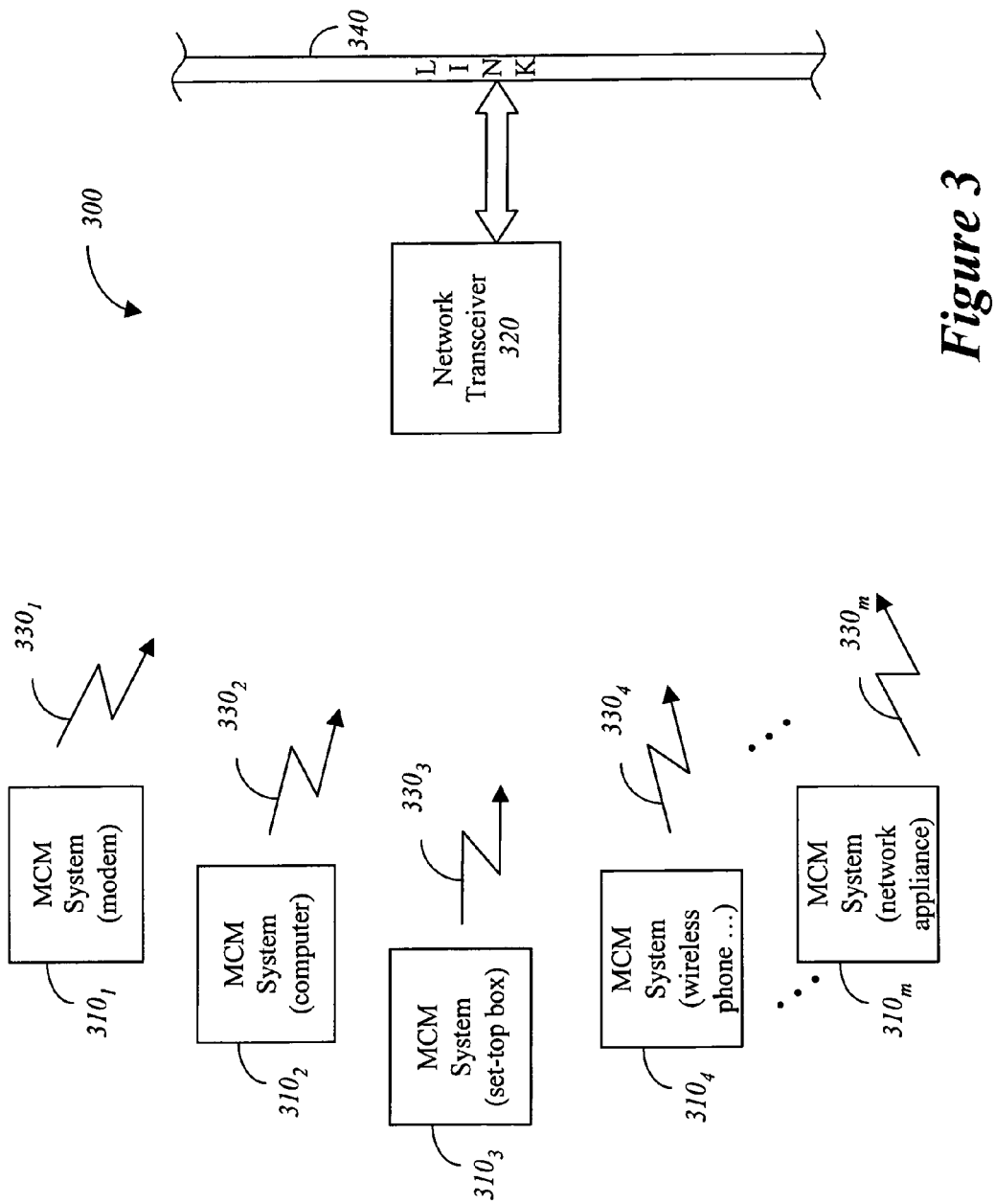
FIG. 3 is an exemplary embodiment of a communication network utilizing the invention.

Referring to FIG. 3, an exemplary embodiment of a communication network utilizing the invention is shown. The communication network 300 comprises a plurality of MCM systems $310_1$-$310_M$ (M≧1) in communication with a network transceiver 320 via links $330_1$-$330_M$. These links $330_1$-$330_M$ may be wired or wireless links. In addition, the network transceiver 320 may be further coupled to a link 340 operating as networking lines for an establishment (e.g., residence, apartment building, place of business, etc.) as shown. For instance, the link 340 may be electrical wiring (e.g., AC power line) which data is transmitted over such wiring in accordance with current or future HOMEPLUG™ standards. Examples of the "network transceiver" include a computer (e.g., gateway, server, etc.), a router, a switching device, a wireless networking access point (e.g., WLAN access point). Of course, although not shown, one or more of the MCM systems $310_1$-$310_M$ may be configured to communicate with other MCM system(s) acting as transceiver(s).

Each MCM system $310_1$, . . . , or $310_M$ is a product that supports the non-data bearing carrier random modulation scheme, namely the modulation of reliable carriers with the data to be transmitted and the modulation of the non-data bearing carriers with random data. The modulated carriers are transmitted over a composite channel to the network transceiver 320 (or another MCM system) acting as a receiver. Examples of certain types of MCM systems include various types of MCM modems (wired or wireless), a computer with wireless connectivity (e.g., a gateway or server, hand-held "PDA", a data terminal, laptop, desktop, etc.), a set-top box, a network appliance, a wireless communication device (e.g., phones, pager, etc.) and the like.

Figure 4:
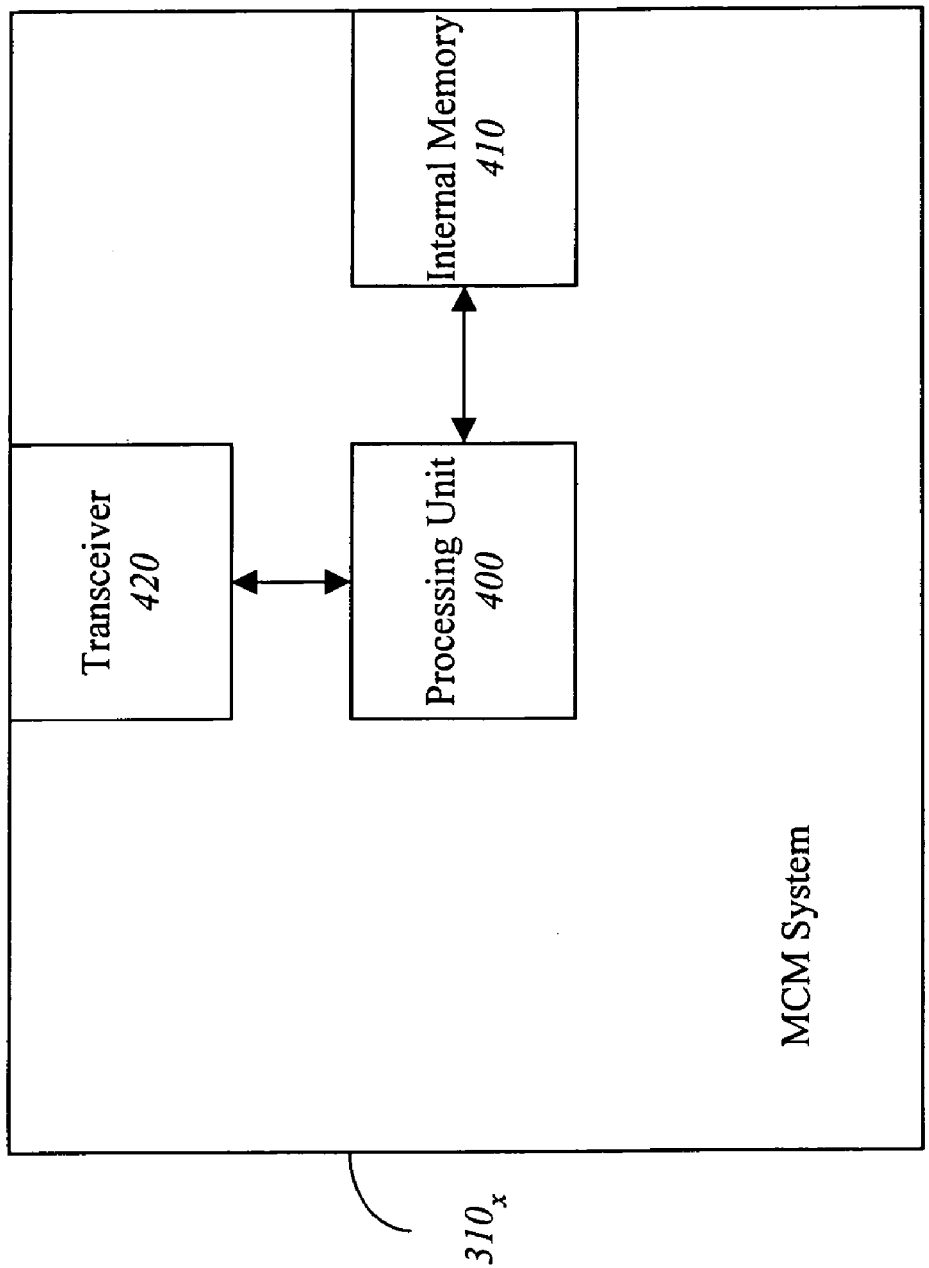
FIG. 4 is an exemplary embodiment of internal logic of a MCM system.

Referring now to FIG. 4, an exemplary embodiment of internal logic of a MCM system is shown. The MCM system $310_x$ includes a processing unit 400, an internal memory 410 and a transceiver 420. Configured as any readable storage device such as a magnetic, optical, or semiconductor storage medium, the internal memory 410 may be either physically independent from the processing unit 400 or integrated within the processing unit 400. In one embodiment, the internal memory 410 may be implemented as any type of non-volatile memory such as flash memory, hard disk, on-chip ROM and the like. Of course, it is contemplated that the internal memory 410 may include volatile memory or a combination of volatile and non-volatile memory. The internal memory 410 stores multi-carrier modulation software, which enables the processing unit 400 to perform non-data bearing carrier random modulation. Of course, it is contemplated that the MOM system $310_x$ does not require memory if its non-data bearing carrier random modulation functionality is hardwired.

The transceiver 420 enables modulated carrier signals to be output over a link and destined for receipt by the network transceiver 320 of FIG. 3 or perhaps another MCM system (not shown). The transceiver 420 further enables channel characterization data to be received from the network transceiver 320 (or another MCM system) as well.

Figure 5:
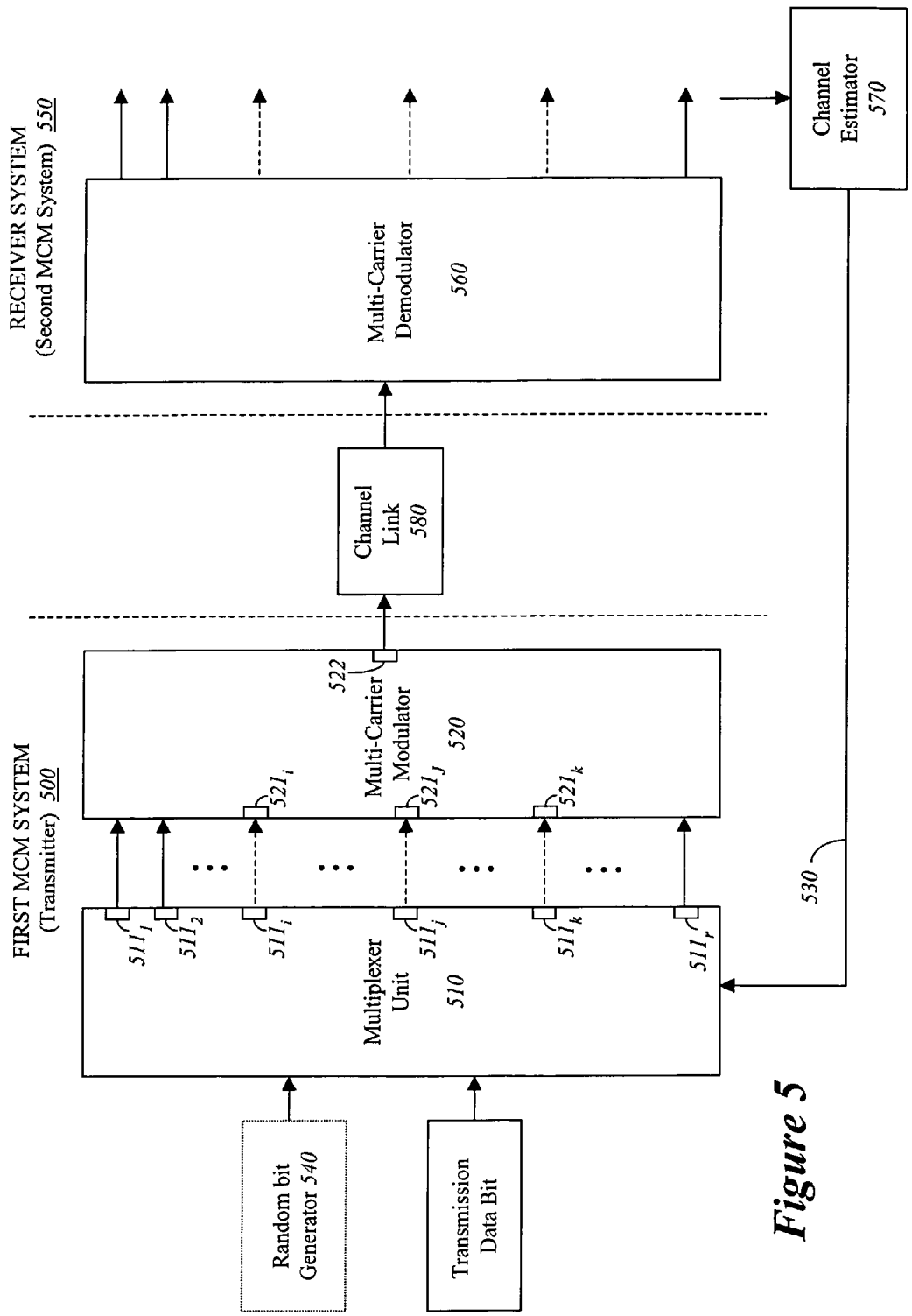
FIG. 5 is an exemplary embodiment of a general block diagram illustrative of logic within a first MCM system (transmitter) that modulates non-data bearing carriers with random data for transmission to a second MCM system (receiver)

Referring to FIG. 5, an exemplary embodiment of a general block diagram illustrative of logic within a first MCM system (transmitter) 500 (e.g., MCM system $310_x$) that modulates non-data bearing carriers with random data for transmission to a receiver system 550 (e.g., a second MCM system, network transceiver 320 of FIG. 3, etc.) is shown. For this embodiment, the first MCM system 500 comprises a multi-plexer unit 510, a multi-carrier modulator 520 and a feedback link 530. A (pseudo) random bit generator 540 may be implemented within the first MCM system 500 as represented by dashed lines. The receiver system 550 includes a multi-carrier demodulator 560 and a channel estimator 570. These systems 500 and 550 communicate over a channel link 580.

Herein, the feedback link 530 provides data from the channel estimator 570 of the receiver system 550 as to which carriers of a transmit signal, if any, possess channel characterization that would cause them to be deemed to exist in an unreliable state. For example, the channel estimator 570 may operate in accordance with blind channel estimation (no knowledge of the transmitted data is required) or data based channel estimation (knowledge of the transmitted data is required so pseudo-RNG used). Both types of channel estimation may analyze signal-to-noise ratio (SNR), bit error rate (BER) and/or other signal characteristics of each carrier. The channel characterization of each carrier may be carried out by observing the general characteristics of the signal such as SNR (blind) or by observing the quality of the values transferred to the receiver system (data based) 550 and/or comparing them to values previously stored therein. For example, the transmit signal may be transferred in an encoded format, decoded at the receiver system 550 and re-encoded for comparison with the original received signal.

The multiplexer unit 510 uses the data provided from the channel estimator 570, which is referred to as "carrier map," to select which output ports $511_1, \ldots, 511_R$ provide desired transmission data or random data. Perhaps, as an option, the number of output ports corresponding to the number of carriers forming the transmit signal as shown (e.g., R=N). For clarity, as represented by dashed lines, outputs from ports $511_i$, $511_j$ and $511_k$ (where i≠j≠k) are random data because these carriers are non-data bearing and even deemed to be unreliable. Thus, the input ports $521_i$, $521_j$ and $521_k$ of the multi-carrier modulator 520 receive random data in lieu of transmission data. This causes the $i^{th}$, $j^{th}$ and $k^{th}$ carriers to be modulated with the random data and transmitted from output port 522 over channel link 580 as part of the transmit signal to the receiver system 550. The $i^{th}$, $j^{th}$ and $k^{th}$ carriers are modulated in accordance with OFDM, FDMA, Spread Spectrum, FDM, wavelet based or other types of modulation techniques.

Figure 6:
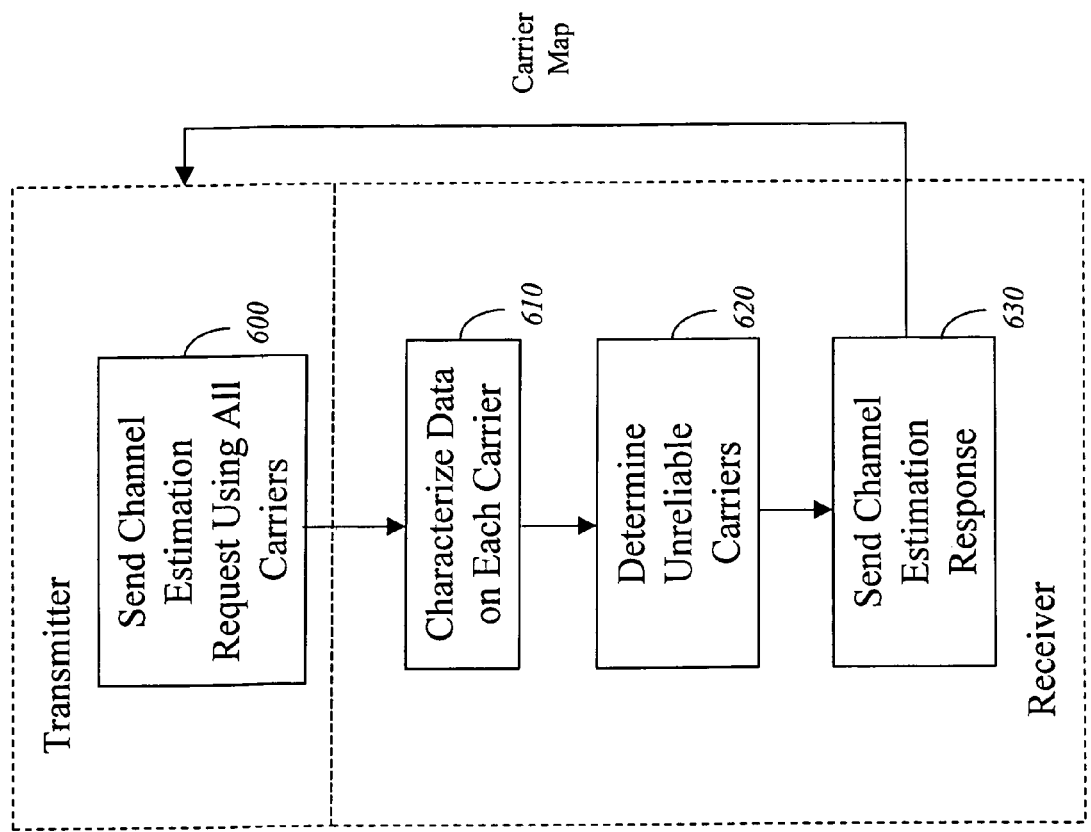
FIG. 6 is an exemplary embodiment of operations between a transmitter and a receiver in accordance with non-data bearing carrier random modulation.

Referring now FIG. 6, an exemplary embodiment of the operations between a transmitter and a receiver in accordance with non-data bearing carrier random modulation is shown. Initially, the transmitter (e.g., first MCM system) sends a channel information request to the receiver (e.g., second MCM system, network transceiver, etc.) to characterize all carriers associated with the channel link (block 600). In response to receiving the channel information request, the receiver analyzes the received signal and characterizes the data placed on each carrier (block 610). Such characterization may be through analysis of the SNR, BER, and the like. Thereafter, the receiver determines which carriers are in an unreliable state and outputs a carrier map over the feedback link to the transmitter (blocks 620 and 630). The carrier map indicates to the transmitter which carriers are deemed to be unreliable so that no data is placed on to such carriers. In addition, the carrier map is used by the transmitter to control placement of random data on to those non-data bearing carriers.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. For example, it may be possible to implement the invention or some of its features in hardware, firmware, software or a combination thereof.

What is claimed is:

1. A method comprising:
   identifying a carrier of a plurality of carriers that is in a non-data bearing state, including (i) receiving feedback information as to which carriers of the plurality of carriers are estimated to be unreliable for subsequent placement in a non-data bearing state, and (ii) selecting the non-data bearing carrier based on the information; and
   modulating the non-data bearing carrier with random data.

2. The method of claim 1, wherein the non-data bearing carrier is a pilot tone.

3. The method of claim 1, wherein the non-data bearing carrier is used for a function besides data transmission including channel characterization.

4. The method of claim 1, wherein the non-data bearing carrier is used for at least one of synchronization, carrier recovery and timing recovery.

5. The method of claim 1, wherein the non-data bearing carrier is selected by use of a carrier map supplied by a channel estimator to a transmitter adapted for the modulating of the non-data bearing carrier with the random data.

6. The method of claim 1, wherein the non-data bearing carrier is selected by the feedback information being a carrier map that identifies carriers within a signal that are determined to be unreliable as of a most recent estimation of the signal.

7. The method of claim 1, wherein prior to modulating the non-data bearing carrier, the method further comprises producing the random data as a pseudo-random bit stream.

8. The method of claim 7, wherein the modulating of the non-data bearing carrier is performed in accordance with Orthogonal Frequency Division Multiplexing (OFDM).

9. A method comprising:
   identifying carriers of a plurality of carriers that are in a non-data bearing state based on feedback information received from a channel estimator that is adapted to estimate which carriers of the plurality of carriers is considered to be unreliable;
   selecting a first non-data bearing carrier of the identified carriers in the non-data bearing state;
   modulating the first non-data bearing carrier with random data in order to reduce power spectral density irregularities at a frequency associated with the first non-data bearing carrier.

10. The method of claim 9, wherein the first non-data bearing carrier is a pilot tone.

11. The method of claim 9, wherein the first non-data bearing carrier is used for a function besides data transmission including channel characterization.

12. The method of claim 9, wherein the first non-data bearing carrier is modulated with the random data being data produced by a random bit generator.

13. The method of claim 9, wherein the first non-data bearing carrier is modulated with the random data being data produced by a pseudo-random bit generator.

14. The method of claim 9, wherein prior to modulating the first non-data bearing carrier, the method further comprises producing the random data as a pseudo-random bit stream.

15. The method of claim 14, wherein the modulating of the first non-data bearing carrier is performed in accordance with Orthogonal Frequency Division Multiplexing (OFDM).

16. A method comprising:
   identifying a non-data bearing carrier from a plurality of carriers that are in a non-data bearing state by a multi-carrier modulation system, the identifying of the non-data bearing carrier is based on feedback information received from a source remotely located from the multi-carrier modulation system, the non-date bearing carrier being used for channel characterization; and
   modulating the non-data bearing carrier with random data.

17. The method of claim 16, wherein the non-data being carrier being based on a carrier map received from the source.

* * * * *